(12) United States Patent
van der Laan

(10) Patent No.: US 9,093,200 B2
(45) Date of Patent: Jul. 28, 2015

(54) MULTIPHASE COAXIAL SUPERCONDUCTING CABLES AND CORC DEGAUSSING SYSTEM

(71) Applicant: Advanced Conductor Technologies LLC, Boulder, CO (US)

(72) Inventor: Daniël Cornelis van der Laan, Boulder, CO (US)

(73) Assignee: Advanced Conductor Technologies LLC, Boulder, CO (US)

( * ) Notice: Subject to any disclaimer, the term of this patent is extended or adjusted under 35 U.S.C. 154(b) by 0 days.

(21) Appl. No.: 14/326,204

(22) Filed: Jul. 8, 2014

(65) Prior Publication Data
US 2015/0018221 A1    Jan. 15, 2015

Related U.S. Application Data

(60) Provisional application No. 61/844,317, filed on Jul. 9, 2013.

(51) Int. Cl.
| | | |
|---|---|---|
| H01L 39/24 | (2006.01) | |
| H01B 12/06 | (2006.01) | |
| H01B 13/00 | (2006.01) | |
| H01B 12/02 | (2006.01) | |
| H02G 15/34 | (2006.01) | |

(52) U.S. Cl.
CPC .............. H01B 12/06 (2013.01); H01B 12/02 (2013.01); H01B 13/0036 (2013.01); H02G 15/34 (2013.01); *Y10T 29/49014* (2015.01)

(58) Field of Classification Search
CPC . H01L 39/143; H01L 39/248; H01L 39/2419; C04B 35/45

USPC ............................................. 505/230, 240, 231
See application file for complete search history.

(56) References Cited

U.S. PATENT DOCUMENTS

| | | | |
|---|---|---|---|
| 7,451,719 B1 * | 11/2008 | Fitzpatrick et al. ........ 114/240 R |
| 8,044,752 B2 * | 10/2011 | Otto et al. ...................... 335/216 |
| 8,478,374 B2 | 7/2013 | Maguire et al. |
| 8,517,749 B2 * | 8/2013 | Marshall ........................ 439/194 |
| 8,731,629 B2 | 5/2014 | King et al. |

FOREIGN PATENT DOCUMENTS

| | | |
|---|---|---|
| EP | 2 228 806 | 9/2010 |
| JP | 09-055241 | 2/1997 |
| JP | 10-126917 | 5/1998 |
| JP | 10-233246 | 9/1998 |

* cited by examiner

*Primary Examiner* — Colleen Dunn
(74) *Attorney, Agent, or Firm* — Foley & Lardner LLP

(57) ABSTRACT

A superconducting cable and connection structure includes one or more superconducting cables. Each cable has superconducting tapes wound about a former in a plurality of phases. Superconducting tapes of a first phase extends further toward a distal end of each cable end than the superconducting tapes of the second phase. The first and second cable ends of one superconducting cable (or a first end of a first superconducting cable and a second end of a second superconducting cable) are arranged with the first phase of the second cable end electronically coupled to the second phase of the first cable end. Connector structures may couple the cable ends together. The cable(s) form one or more loops within a cryostat, to form a degaussing coil.

38 Claims, 7 Drawing Sheets

MULTIPHASE COAXIAL SUPERCONDUCTING CABLES AND CORC DEGAUSSING SYSTEM

CROSS-REFERENCE TO RELATED PATENT APPLICATIONS

This application claims priority from Provisional U.S. Application 61/844,317 filed Jul. 9, 2013, which is incorporated herein by reference in its entirety.

FIELD OF THE INVENTION

Embodiments of the present invention relate to multiphase coaxial superconducting cables, degaussing systems that employ such cables, and methods of making and using the same.

BACKGROUND

Certain applications of use of superconducting cables, such as degaussing coils, require a relatively large magnetic field to be generated over a relatively large cross-section or volume. For instance, degaussing coils of one or more superconducting cables can be wound within the hull of a ship (for example, a Navy ship or the like), covering a relatively large portion of its footprint. In such applications, one or more superconducting cables can be looped around many times, where each cable is connected to carry a relatively low electrical current of about 100 A. By increasing the number of turns in the wound coils, the current (Amperes) multiplied by the number of turns is increased, thereby increasing the magnetic field generated when an electrical current flows through the cables.

Superconducting degaussing systems have included coils in which each turn is formed by a thin superconducting tape. In such systems, many insulated superconducting tapes are bundled together and inserted into a long flexible cryostat that is installed within the ship. The inside of the cryostat and, thus, the bundle of superconducting tapes, is cooled with flowing helium gas that is cooled to cryogenic temperatures. The superconducting tapes can be relatively small and lightweight, but tend to be relatively fragile. The tapes typically have an aspect ratio that is inconvenient for cabling, in that typical tapes are flat tapes with dimensions of about 1-10 mm in width and 0.05-0.5 mm in thickness.

One of the challenges with superconducting degaussing systems is that it can be difficult to make reliable and low resistive connections between the tapes in such a way that the tapes form a continuous current loop. In such degaussing systems, all tapes may need to be electrically connected in series at both ends of the cryostat such that the current runs from tape number 1 into tape number 2, then from tape number 2 into tape number 3, etc. Each cable can have up to 20 (or more) tapes to be connected. Thus, many connections must be made, for example, in a junction box in which the superconducting tapes are soldered in series through a connecting structure.

While the number of turns of a degaussing cable can be reduced by passing higher current levels through a degaussing cable, in many contexts the higher current levels may require a high-current power supply and high-current leads that can introduce a large heat load into the cryogenic system.

Superconducting cables, such as, but not limited to Conductor on Round Core (CORC) cables, may be configured with multiple superconducting tapes that are wound in multiple phases on a former. Some of the superconducting tapes, such as, but not limited to RE-Ba$_2$Ca$_3$O$_{7-\delta}$ (REBCO) (RE=rare earth) coated conductors contain a superconducting film that is located on one side of a metal substrate, with one or more resistive barrier layers between the superconducting film and the substrate. In such configurations, current may enter and exit the superconducting film from one side of the tape, following a current path with low resistance. Accordingly, in certain cases such superconducting tapes must be oriented such that the side that has the superconducting film faces the connecting structure. Additionally, the bundle of tapes in the cable can be relatively fragile, which can lead to difficulties during formation of tape connections and installation of cables.

DETAILED DESCRIPTION

Figure 1:
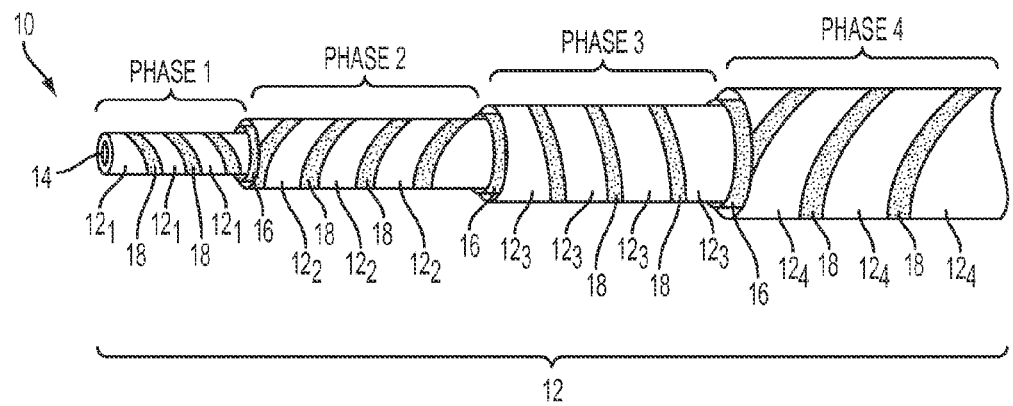
FIG. 1 is a perspective view of a connector end portion of a superconducting cable according to an embodiment of the present invention.

Various embodiments will be described in detail with reference to the accompanying drawings. In some cases, the same reference numbers may be used in the drawings to refer to the same or like parts. Different reference numbers may be used to refer to different, same, or similar parts. References made to particular examples and implementations are for illustrative purposes, and are not intended to limit the scope of the invention or the claim.

Embodiments of the present invention relate to cable configurations having one or more coaxially wound superconducting cables that contain at least two or more phases that are insulated from each other, and methods of making and using the same. Further embodiments relate to systems such as, but not limited to degaussing systems, that include one or more of such cable configurations, where a magnetic field is to be generated over a relatively large volume, as well as methods of making and using such systems.

Certain embodiments of the present invention relate to degaussing systems that are advantageously configured such that the superconducting tapes form a relatively compact cable in which the orientation of the tapes with respect to their superconducting film is the same for each tape anywhere in the cable, and everywhere along the cable circumference. Further embodiments are advantageously configured such that the cable termination (connection end) is made in a relatively low number of steps, yet provides a suitably reliable (with minimal or no connection failures), low-resistive connection joint.

Coaxial Cable Configurations

According to embodiments of the present invention, a superconducting cable is configured with superconducting tapes wound in two or more phases (multiphase), coaxially around the same core (or former). Each phase is electrically insulated from each adjacent phase by one or more electrically insulating materials arranged between adjacent phases. In particular embodiments, the two or more phases of superconducting tapes are wound coaxially in a Conductor on Round Core (CORC) configuration. CORC cables can have two or more (a plurality of) superconducting tapes wound around a former having a relatively small diameter.

Figure 2:
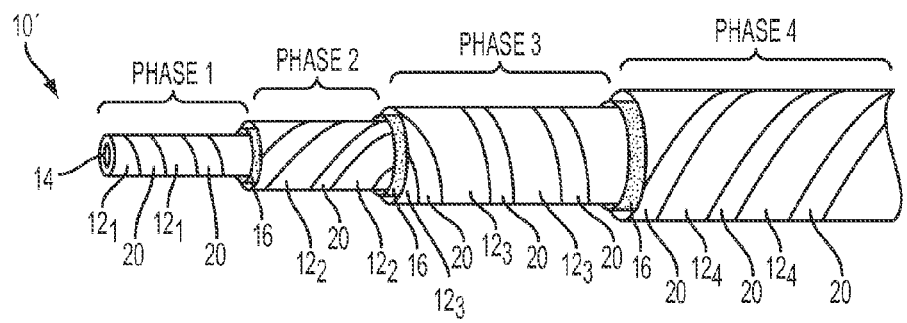
FIG. 2 is a perspective view of a connector end portion of a superconducting cable according to another embodiment of the present invention.
Figure 3:
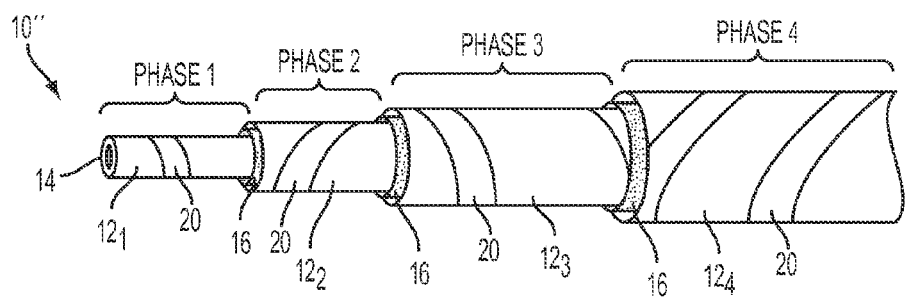
FIG. 3 is a perspective view of a connector end portion of a superconducting cable according to another embodiment of the present invention.

Example superconducting cable configurations are shown in FIGS. 1-3, where like reference numerals are used to designate like parts in the three drawings. An example of a multiphase superconducting cable 10 according to an embodiment of the present invention is shown in FIG. 1. The multiphase superconducting cable 10 in FIG. 1 has a plurality of superconducting tapes 12 ($12_1$, $12_2$, $12_3$ and $12_4$), wound in four phases (phase 1, phase 2, phase 3 and phase 4), respectively, on a former 14. Other embodiments may be configured with superconducting tapes wound in a single phase, two phases, three phases or more than four phases.

In multiphase cable embodiments, each phase is insulated from an adjacent phase by one or more layers of an electrically insulating material 16. In the embodiment in FIG. 1, electrically insulating material 16 is arranged between phase 1 and phase 2, and further material 16 is arranged between phase 2 and phase 3, and between phase 3 and phase 4. In further embodiments, additional insulating material 16 is arranged or wound on and over the outermost phase (e.g., phase 4 in FIG. 1). The insulating material 16 between each pair of adjacent phases may be any suitable material that provides suitable electrical insulating characteristics and mechanical flexibility to function as described herein. In particular embodiments, the insulating material 16 comprises a tape of polyimide film such as, but not limited to a Kapton® tape. In other embodiments, the insulating material 16 comprises one or more (a plurality of) layers of a polyester, plastic, silicon, rubber, heat shrink tubing of polyester or other suitable material, or other electrically insulating material, or combinations thereof. According to one example embodiment, a CORC cable is wound with two or more (as many as twenty or more) phases that are insulated from each other by winding one or more (a plurality of) layers of Kapton® tape, one or more (a plurality of) layers of polyester heat shrink tubing, or a combination thereof.

Each phase contains at least one layer of one or more superconducting tapes 12. In further embodiments, one or more (or each) of the phases has two or more (a plurality of) layers of superconducting tapes 12. Each layer has one superconducting tape 12, or a plurality of superconducting tapes 12 wound in parallel (side by side, at approximately the same radial distance from the former 14 as each other wind or tape in the same layer).

In particular embodiments, one or more (or all) of the superconducting tapes 12 in any one or more (or all) of the layers, in any one or more (or all) of the phases are wound with a gap 18 between adjacent tapes in the same layer. For example, gaps 18 may be provided to improve flexibility of the cable, to minimize the number of tapes or amount of each tape needed to fill each layer, or both. Furthermore, gaps 18 can help simplify formation or connection of terminals.

In further embodiments, the superconducting tape(s) 12 in one or more (or all) of the layers in one or more (or all) of the phases are wound in parallel with one or more (a plurality of) strips of a non-superconducting, electrically conductive material such as, but not limited to copper, silver, or the like. For example, in the embodiment of FIG. 2, a cable 10' is shown with a plurality of superconducting tapes 12 in multiple phases that are insulated from each other with insulating material 16, similar to the cable 10 described above with reference to FIG. 1. However, in the embodiment in FIG. 2, the cable 10' includes a plurality of strips of non-superconducting, electrically conductive material 20 wound between adjacent winds of the superconducting tapes 12 in one or more (or each) layer of each phase. In other embodiments, electrically conductive material 20 is wound between adjacent winds of superconducting tapes 12 in one or more (or each layer) of one or more, but not all of the phases.

In yet further embodiments, the superconducting tape(s) 12 in one or more (or all) of the layers in one or more (or all) of the phases are wound with a combination of gaps (e.g., gaps 18 shown in FIG. 1) and non-superconducting, electrically conductive material (e.g., material 20 shown in FIG. 2) between adjacent winds in a given layer. Further examples of superconducting cables with one or more superconducting tapes wound around a former are described in U.S. patent application Ser. No. 13/398,746 (Publ. No. 2012/0214675 A1) titled Superconducting Cables And Methods Of Making the Same, by the inventor of the present disclosure (D. C. van der Laan). Yet further examples of superconducting cables with gaps between superconducting tapes wound around a former are described in U.S. patent application Ser. No. 14/302,194 titled Superconducting Cable Connections And Methods, by the inventor of the present disclosure (D. C. van der Laan), which is incorporated herein by reference in its entirety.

The embodiments shown in FIGS. 1 and 2 may be configured with two or more (a plurality) of individual superconducting tapes 12 wound side-by-side (in a common radial distance from the former 14) in each layer of each phase. In other embodiments, as represented by the cable 10" FIG. 3, each phase has a single (no more than one) superconducting tape 12 wound in one or more layers. In the embodiment of FIG. 3, the superconducting tape 12 in any one or more (or each) of the phases is wound with a gap 18 between each adjacent wind, similar to the gap 18 described above with respect to FIG. 1. In yet further embodiments, the superconducting tape 12 in any one or more (or each) of the phases in FIG. 3 is wound with a non-superconducting electrically conductive material (e.g., material 20 shown in FIG. 2) between adjacent winds.

In particular embodiments of the cables 10, 10' and 10" in FIGS. 1-3, each of the superconducting tapes 12 has one or more layers or films of superconducting material on one side of a tape substrate. In such embodiments, the tapes are wound with their superconducting film layer(s) on the inside of the wind, facing the former 14. In other embodiments, the tapes are wound with their superconducting film layer(s) on the outside of the wind, facing away from the former 14. In yet other embodiments, the superconducting tapes in any one or more layers (or any one or more phases, or both) include a combination of one or more tapes wound with their superconducting film layer(s) on the inside of the wind (facing the former 14), and one or more tapes wound with their superconducting film layer(s) on the outside of the wind (facing away from the former 14). In yet other embodiments, each of the one or more superconducting tapes in any one layer (or any one phase) is wound with its superconducting film layer (s) on the inside of the wind (facing the former 14), while each of the one or more superconducting tapes in another layer of the same cable (or another phase of the same cable) is wound with its superconducting film layer(s) on the outside of the wind (facing away from the former 14).

Also, in further embodiments of the cables 10, 10' and 10" in FIGS. 1-3, one or more layers of non-superconducting electrically conductive material (not shown) is wound on or within one or more layers of the insulating material 16 between one or more (or each) of the phases. In such embodiments, the one or more layers of non-superconducting electrically conductive material (not shown) may be wound in or on the insulating material 16 during or after the insulating material 16 is wound, but before the next outer layer (e.g., the superconducting tape(s) of the next outer phase) is wound on top of the non-superconducting electrically conductive material. In further embodiments, the one or more layers of non-superconducting electrically conductive material (not shown) is wound on the superconducting tapes of a phase before the insulation material 16 is wound or otherwise applied over that phase (and before the superconductor tape(s) of the next outer phase are wound). In those embodiments, the non-superconducting electrically conductive material can assist in transferring current at terminals, or can help protect the superconducting tapes in the event that the insulation is stripped or becomes abraded.

The current capacity of superconducting tapes at helium gas temperatures can be 100 A or more, which can be sufficient to carry the current in the loop of the degaussing cable, without causing an undesirable amount of heat load through the current leads. Accordingly, a CORC cable configured as shown in FIG. 1, where multiple superconducting tapes 12 are wound per phase, can have the current capacity that is multiple times its operating current. In particular embodiments, a CORC cable as shown in FIG. 1 can be configured to handle an operating current in multiple hundreds of Amperes.

A CORC cable configured as shown in FIG. 2 may have fewer superconducting tapes 12 per phase (as compared to the embodiment of FIG. 1), which can reduce the cost of the cable. Additionally, the inclusion of strips of non-superconducting electrically conductive material 20 that are wound in parallel with the superconducting tapes 12 can beneficially provide additional current paths, especially at the end of the cable where connections are made. In further embodiments, the non-superconducting electrically conductive material 20 also provides additional thermal conduction paths that allow for a better cooling of the cable.

A CORC cable configured as shown in FIG. 3 has only one superconducting tape 12 per layer (or per phase, or both), with gaps 18 or non-superconducting electrically conductive material 20 between the winds of superconducting tape 12, or a combination of gaps 18 and non-superconducting electrically conductive material. In particular embodiments, a CORC cable configured as shown in FIG. 3 may have enough current capacity per phase to operate at currents of around 100 A, while requiring less superconductor tape material.

In particular embodiments, coaxially wound multi-phase superconducting cables as described above are employed for degaussing applications, where such cables can provide significant advantages including, but not limited to one or more (or all) of: 1) improved flexibility of the cable; 2) reduced fragility of the cable relative to a bundle of separate tapes; 3) improved orientation of the superconducting tapes where the superconducting film layer(s) of all of the tapes are facing in the same direction toward or away from the former; 4) improved ability to distinguish one phase from another phase when the cable is connected; 5) consistent orientation of the superconducting tapes along the cable length or over its circumference, or both; and 6) improved protection against damage during connection.

Cable Installation In Cryostat

According to embodiments of the present invention, one or more multiphase cables as described herein, are employed in a degaussing system, or other system that requires a relatively large magnetic field to be generated over a relatively large cross-section or volume. In particular embodiments, one or more coaxial, multi-phase cable for degaussing is received in (for example, pulled through) a cryostat. The cryostat may be pre-installed in a ship or other structure, before receiving one or more multiphase cables as described herein. In other embodiments, the cryostat is assembled with one or more multiphase cables as described herein, and then installed in the ship or other structure, as an assembled unit.

The cryostat may be any suitable structure for maintaining a cryogenic temperature. In particular embodiments, such structures includes one or more chambers for receiving and containing one or more multiphase cables as described herein, and a liquid or gaseous helium (or other cryogenic fluid or gas) that maintains the chamber at or below a desired temperature, such as, but not limited to, a cryogenic temperature. In an example embodiment as shown in FIGS. 4a-4d, a cryostat includes a housing 30 that has an annular or partially annular (partially ring-shaped) chamber 32 in which a cryogenic fluid or gas and a superconducting cable 40 (such as, but not limited to one of the cables 10, 10' or 10" described herein) is contained. The annular or partially annular (partially ring-shaped) chamber 32 forms and contains the superconducting cable 40 in one or more loops. In the embodiment in FIGS. 4a-d, the cryostat chamber 32 is open on both ends. In other embodiments, the cryostat chamber 32 is closed on at least one end. The housing 30 may be made of any suitable material having sufficient rigidity, structure and strength to function as described herein, such as, but not limited to steel, titanium, aluminum, or the like.

Depending on the desired Amperes-turns, a single superconducting cable 40 may be formed in one loop or more than one (plurality of) loops within the cryostat chamber 32. In further embodiments, two or more (a plurality of) superconducting cables 40 are formed in one or more (plurality of) loops within the cryostat chamber 32. In particular embodiments, the degaussing system is configured by pulling one or more superconducting cables 40 sufficiently through the cryostat chamber 32 to loop the cable(s) one or more times (to form one or more cable loops). In embodiments in which two or more superconducting cables 40 are pulled through the cryostat chamber 32, the superconducting cables 40 may be pulled together, simultaneously. However, in further embodiments, a single superconducting cable 40 may be formed multiple loops or turns in the cryostat chamber 32, for example, to reduce the number of cable connections and thus resistive solder joints.

Figure 4B:
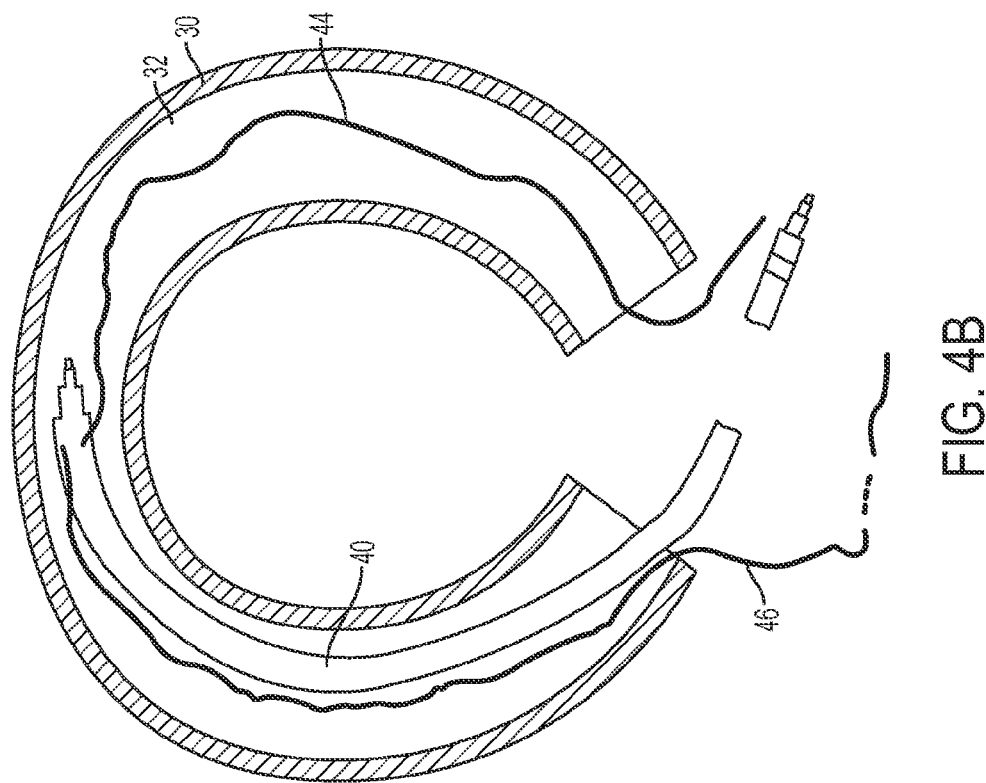
FIGS. 4a-d are schematic views of a portion of a cryostat system receiving a superconductor cable.
Figure 4A:
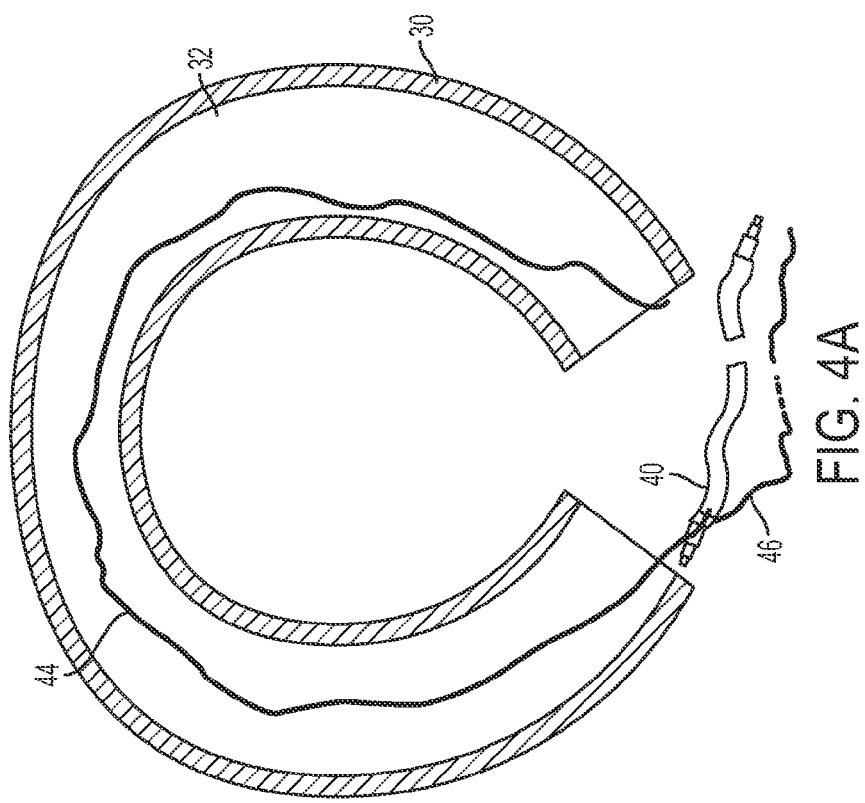

In particular embodiments, one or more cables 40 are installed in a cryostat chamber 32 by, first, connecting a pulling wire 44 to the superconducting cable 40 (e.g., at or near a first end of the superconducting cable 40) and extending a free end of the pulling wire 44 into a first end of the cryostat chamber 32, and through the cryostat chamber 32, such that the free end portion of the pulling wire 44 extends out of the second end of the cryostat chamber 32, as shown in FIG. 4a. In addition, a second pulling wire 46 is connected to the superconducting cable 40 (e.g., at or near the first end of the superconducting cable 40), also as shown in FIG. 4a.

Figure 4D:
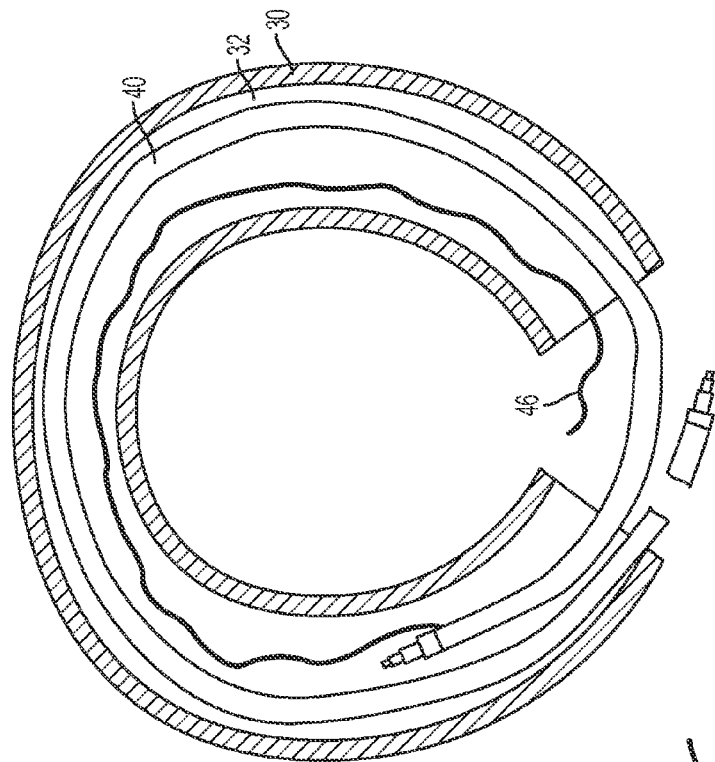
Figure 4C:
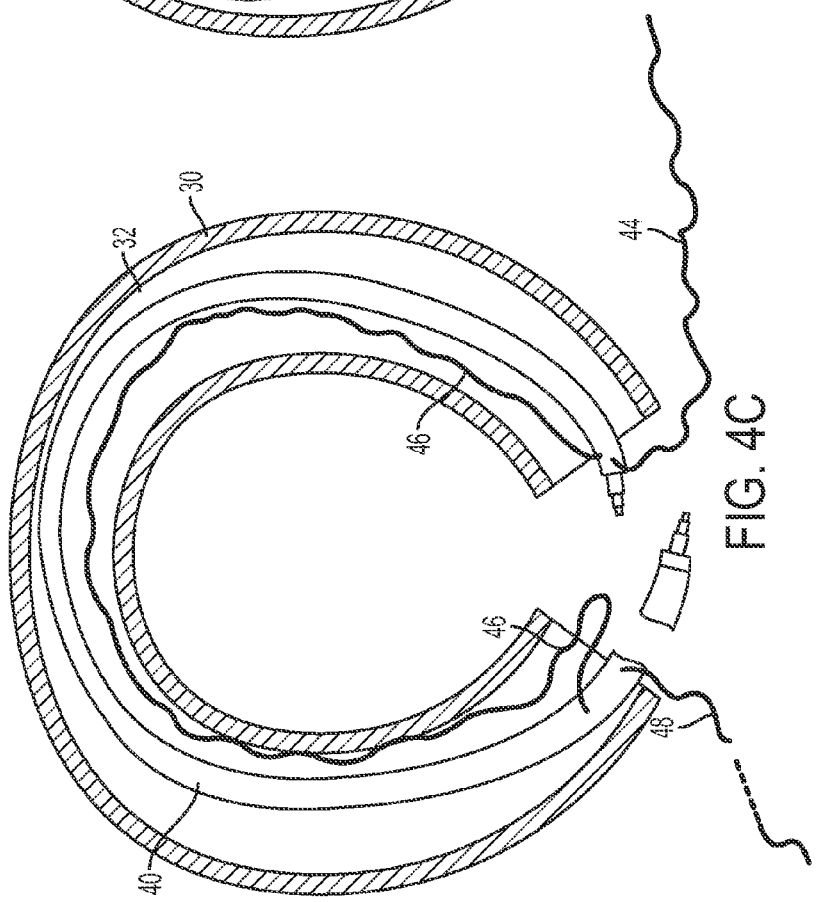

Then, by applying a pulling force on the pulling wire 44, the first end of the superconducting cable 40 and one end of the second pulling wire 46 is pulled into and through the cryostat chamber 32, until an end of the superconducting cable 40 is pulled through the second end of the cryostat chamber 32 with one end of the second pulling wire 46, as shown in FIG. 4b. After a first length of the superconducting cable 40 is pulled through the cryostat chamber 32 the first time, the superconducting cable end that extends out of the second end of the cryostat chamber 32 is, then, connected to the free end portion of the second pulling wire 46 (i.e., the end portion of the second pulling wire 46 that extends out of the first end of the cryostat chamber 32), as shown in FIG. 4c, to be pulled back into the first end of the cryostat chamber 32. In addition, a third pulling wire 48 may be connected to the superconducting cable 40 (e.g., at or near the first end of the superconducting cable 40). Then, a pulling force is applied to the second pulling wire 46 to pull a further length of the superconducting cable 40 through the cryostat chamber 32 (as shown in FIG. 4d), until the cable end is again extended out of the second end of the cryostat chamber, while also pulling a length of the third pulling wire 48 through the cryostat chamber 32. This action forms a second loop of the superconducting cable 40 within the cryostat chamber 32. Further loops can be formed in a similar manner, by connecting a further pulling wire to the superconducting cable 40 and pulling the cable end back into the first end of the cryostat chamber 32 and through the cryostat chamber 32, by applying a pulling force on the third pulling wire 48, and so forth.

The resulting cryostat structure includes the cryostat housing 30 containing one or more (a plurality of) loops of the superconducting cable 40. In particular embodiments, a cryostat housing 30 containing one or more (a plurality of) loops of the superconducting cable 40 may be assembled in a factory or other facility prior to being installed in a ship (or other vehicle or structure). Thereafter, the assembled cryostat structure may be installed in a ship (or other vehicle or structure). In other embodiments, the cryostat housing 30 may be installed in the ship (or other vehicle or structure) before installing the superconducting cable 40 and, thereafter, the superconducting cable 40 is installed within the cryostat chamber 32. In further embodiments two or more superconducting cables 40 are installed in the same cryostat chamber 32, for example, in a manner as described above.

After the superconducting cable 40 has been pulled though the cryostat housing 30 (in one or more loops), the ends of the superconducting cable are exposed (and may be stripped or have been pre-stripped) to expose each of the phases of superconducting tape windings. In particular embodiments, the cable phases are stripped in such a way that the layer of insulating material 16 between each phase extends partly over the exposed portion of the underlying phase, to ensure the phases remain electrically insulated even at the terminals.

Cable Connector Configurations

Figure 5:
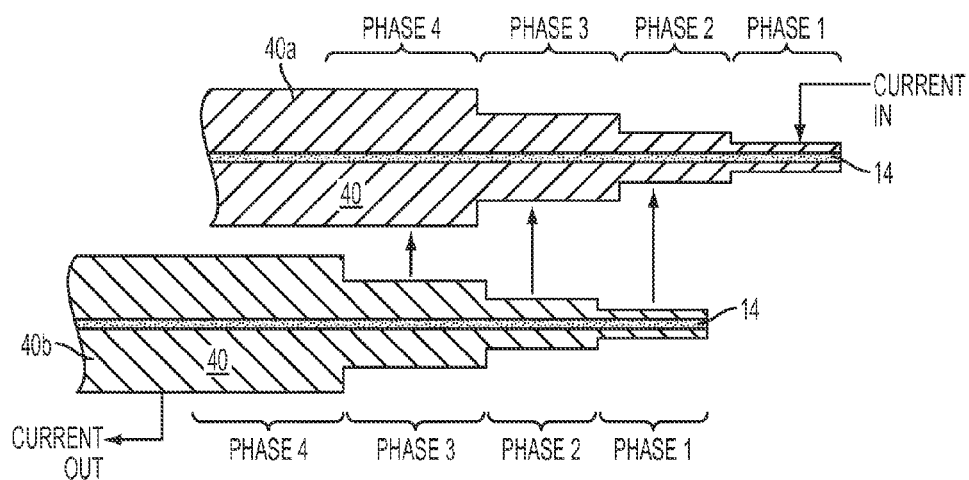
FIG. 5 is a side, cross-section view of connector end portions of a superconducting cable according to a further embodiment of the present invention.

In embodiments in which a single superconducting cable 40 is installed in the cryostat chamber 32 in one or more loops, the two stripped ends of the superconducting cable 40 are brought together as shown in FIG. 5. As shown in FIG. 5, the cable ends form connectors that are arranged adjacent each other, in parallel (with the longitudinal axis of the two cable end portions arranged generally parallel to each other), and pointed in the same direction. However, the cable ends are arranged with one cable end (cable end 40a) extending slightly further into the connecting region than the other cable end (cable end 40b) such that the individual phases on one cable end are staggered relative to the individual phases on the other cable end, as shown in FIG. 5. In the embodiment of FIG. 5, the cable ends 40a and 40b are arranged such that superconducting tapes of phase 1 of a first cable end are arranged adjacent and aligned with (to electrically connect with) superconducting tapes of phase 2 of the second cable end. Similarly, superconducting tapes of phase 2 of the first cable end are arranged adjacent and aligned with (to electrically connect with) superconducting tapes of phase 3 of the second cable end, and so forth.

A staggered configuration as shown in FIG. 5 provides an electrical communication (to allow current to enter) from a current lead (not shown in FIG. 5) into, for example, phase 1 (the first phase wound onto the former) of the cable end 40a, then through the cable 40 to phase 1 of the cable end 40b. From phase 1 of the cable end 40b, electrical communication is provided (to allow current to flow) to phase 2 of the cable end 40a, then through the cable 40 to phase 2 of the cable end 40b.

From phase 2 of the cable end 40b, electrical communication is provided (to allow current to flow) to phase 3 of the cable end 40a, then through the cable 40 to phase 3 of the cable end 40b. From phase 3 of the cable end 40b, electrical communication is provided (to allow current to flow) to phase 4 of the cable end 40a, then through the cable 40 to phase 4 of the cable end 40b. A further current lead (not shown) may be connected in electrical communication with phase 4 of the cable end 40b. Thus phase n of the cable end 40b electrically connects to phase n+1 of the cable end 40a. While the embodiment in FIG. 5 shows a cable with four phases, other embodiments may employ a cable having two, three or more than four (for example, but not limited to up to twenty or more) phases that are electrically connected in a staggered manner, similar to that shown in FIG. 5.

A similar method of aligning the individual phases of the cable ends (or connectors) as show in FIG. 5 can be applied when two or more superconducting cables are pulled through the cryostat chamber 32 in parallel. In such embodiments, each of the superconducting cables is provided with two cable ends (or connectors) that are stripped or otherwise configured similar to the cable ends 40a and 40b described with reference to FIG. 5.

Figure 6:
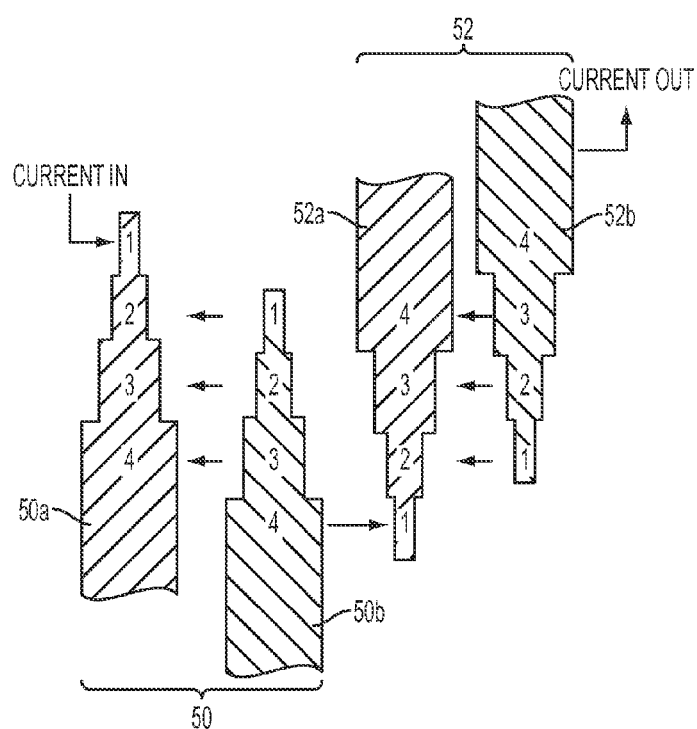
FIG. 6 is a side, cross-section view of connector end portions of two superconducting cables according to an embodiment of the present invention.

For example, a configuration for connecting the two ends of each of two superconducting cables 50 and 52 that run in parallel through the cryostat chamber 32 is shown in FIG. 6. In FIG. 6, a first cable 50 includes cable ends (or connectors) 50a and 50b, while a second cable 52 has cable ends (or connectors) 52a and 52b. The cable ends (or connectors) 50a and 50b are arranged in staggered configuration similar to that of FIG. 5, such that an electrical communication to an external current lead (not shown) may be provided to phase 1 of cable end 50a, to allow current to enter phase 1 of the cable 50 and flow to phase 1 of the cable end 50b. From phase 1 of the cable end 50b, electrical communication is provided (to allow current to flow) to phase 2 of the cable end 50a, then through the cable 50 to phase 2 of the cable end 50b. From phase 2 of the cable end 50b, electrical communication is provided (to allow current to flow) to phase 3 of the cable end 50a, then through the cable 50 to phase 3 of the cable end 50b. From phase 3 of the cable end 50b, electrical communication is provided (to allow current to flow) to phase 4 of the cable end 50a, then through the cable 50 to phase 4 of the cable end 50b.

From phase 4 of the cable end 50b, electrical communication is provided (to allow current to flow) to phase 1 of the cable end 52a, then through the cable 52 to phase 1 of the cable end 52b. From phase 1 of the cable end 52b, electrical communication is provided (to allow current to flow) to phase 2 of the cable end 52a, then through the cable 52 to phase 2 of the cable end 52b. From phase 2 of the cable end 52b, electrical communication is provided (to allow current to flow) to phase 3 of the cable end 52a, then through the cable 52 to phase 3 of the cable end 52b. From phase 3 of the cable end 52b, electrical communication is provided (to allow current to flow) to phase 4 of the cable end 52a, then through the cable 52 to phase 4 of the cable end 52b. A further current lead (not shown) may be connected in electrical communication with phase 4 of the cable end 52b. While the embodiment in FIG. 6 shows two cables, each with four phases, other embodiments may employ two or more cables, each having any suitable number of phases that are electrically connected in a staggered manner, similar to that shown in FIG. 6. Such connection configurations allow the separation between the phases of the individual cables that are connected together to be minimized, to minimize the contact resistance.

Figure 7A:
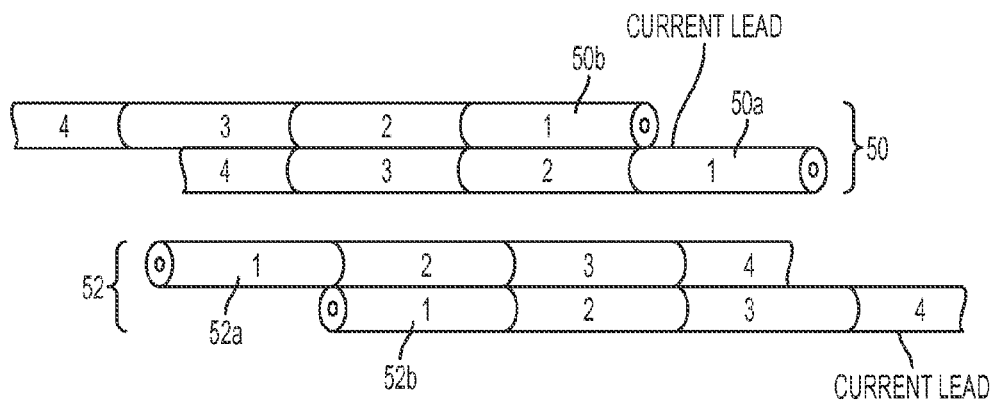
FIGS. 7a and 7b show a perspective view and a cross-section view of connector end portions of two superconducting cables according to an embodiment of the present invention.
Figure 7B:
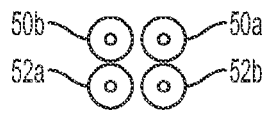

In further embodiments, multiple cables are connected in a staggered arrangement (for example, in the manner described above with respect to FIG. 6), but with the cable ends (or connectors) arranged in a manner to minimize separation between the cable ends (connectors). Thus, for example, in the embodiment of FIGS. 7a and 7b, cables 50 and 52 are arranged such that the separation between phase 4 of the cable end (or connector) 50b of cable 50 and the cable end (or connector) 52a of cable 52 is minimized. As shown in FIGS. 7a and 7b, the cable end (or connector) 50a is arranged adjacent (side-by-side in the horizontal direction of FIG. 7b) with the cable end (or connector) 50b. In addition, the cable end (or connector) 50a is also arranged adjacent (side-by-side in the vertical direction of FIG. 7b) with the cable end (or connector) 52b. Similarly, the cable end (or connector) 52a is arranged adjacent (side-by-side in the horizontal direction of FIG. 7b) with the cable end (or connector) 52b, but is also arranged adjacent (side-by-side in the vertical direction of FIG. 7b) with the cable end (or connector) 50b.

Figure 8:
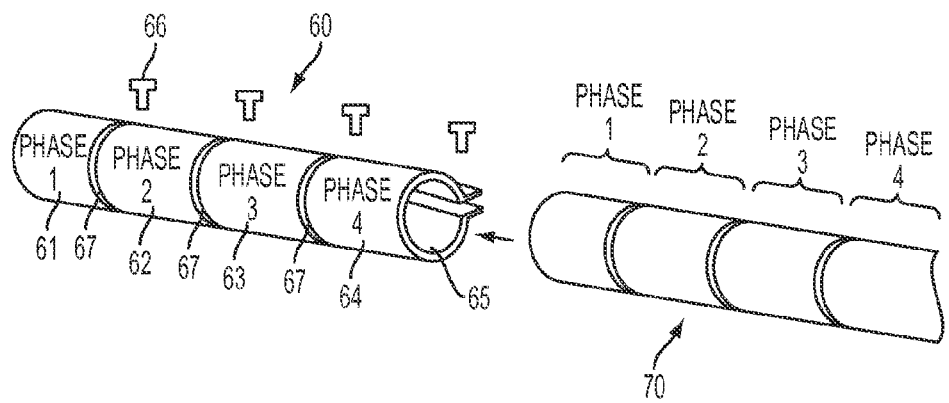
FIG. 8 is a perspective view of a female connector structure and a connector end portion of a superconducting cable according to an embodiment of the present invention.

In further embodiments, one or more cable ends of a superconducting cable as described herein are connected with a female connector structure that makes electrical connections between two or more phases of two or more respective cables. In FIG. 8, a female connector structure 60 is configured to be coupled to (fixed to) a connector end of a superconducting cable 70. The superconducting cable 70 may be any of the superconducting cables 10, 10', 10'', 40, 50 or 52 described herein, or another suitable superconducting cable. In the embodiment of FIG. 8, the cable 70 has a plurality of phases (four in FIG. 8) and the female connector structure 60 has a corresponding plurality (four in FIG. 8) of conductive portions (labeled 61, 62, 63 and 64, respectively). The conductive portions 61-64 are in a linear arrangement, but are spaced from each adjacent conductive portion by an electrically insulating gap or electrically insulating material 67 arranged between adjacent conductive portions. The electrically conductive portions 61-64 may be made of any suitable electrically conductive material, such as, but not limited to copper, silver, aluminum, or the like. The electrically insulating material 62 may be made of any suitable material that provides electrical insulating characteristics such as, but not limited to, plastic, rubber, polyester, polyamide, or the like.

In the embodiment of FIG. 8, the plurality of conductive portions 61-64 are provided in a number that corresponds to the number of phases of the superconducting cable. The respective conductive portions 61-64 of the female connector structure 60 electrically connect to respective phases of the superconducting cable 70 by placing the cable end (or connector) of the cable 70 in an interior channel 65 of the female connector part. In particular embodiments, the female connector structure 60 has two shell portions connected by a hinge, bolts, elastic part, plastic part, clamp or other suitable connection structure 66 that secures the female connector structure 60 to the cable end when the cable end of the cable 70 is received within the interior channel 65. When secured to the cable end of the cable 70, the plurality of conductive portions 61-64 are arranged adjacent and in electrical communication with the respective phases of the superconducting cable 70 that are exposed at the cable end (or connector) of the cable 70, such that conductive portion 61 electrically connects with phase 1, conductive portion 62 electrically connects with phase 2, and so forth. One of the conductive portions 61-64 includes or provides an electrical terminal for electrically connection to a current lead (to connect the current lead to the first or innermost phase 1 or to the last or outermost phase of the cable 70). In further embodiments, the female connector structure 60 has a C-shaped cross-section shape (in a cross section taken perpendicular to the longitudinal axial dimension of the female connector structure 60).

Thus, to connect the female connection structure 60, the cable end (or connector) of the superconducting cable 70 is inserted into the channel 65 of the female connector structure 60. Then, the female connector 60 is closed and pressed around the individual phases of the cable end (or connector) of the cable 70, by tightening bolts, clamps or other suitable connection structure. In particular embodiments, the inner surface of the channel 65 of the female connector 60 is coated with a layer of non-corrosive material such as gold or nickel, or coated with solder that is melted to bond to the cable end (or connector) of the superconducting cable 70, after the female connector 60 is clamped onto the cable end. Additionally or alternatively, the exposed outer surface of each phase of the cable end (or connector) of the superconducting cable 70 is coated with a layer of non-corrosive material such as gold or nickel or with a layer of solder.

In further embodiments, the cable end (or connector) of the cable 70 is prepared by covering exposed superconducting tapes in each phase with solder or with an electrically conductive sleeve placed over the exposed tapes, or both. The sleeve may be made of any suitable electrically conductive material such as, but not limited to copper or other metal. In particular embodiments, the sleeve is coated on its outer surface with a layer of non-corrosive material, such as, but not limited to gold, nickel, or the like. In such embodiments, the solder may be melted, to form a low-resistance current path between the superconducting films in the superconducting tapes and the outer sleeve.

Figure 9A:
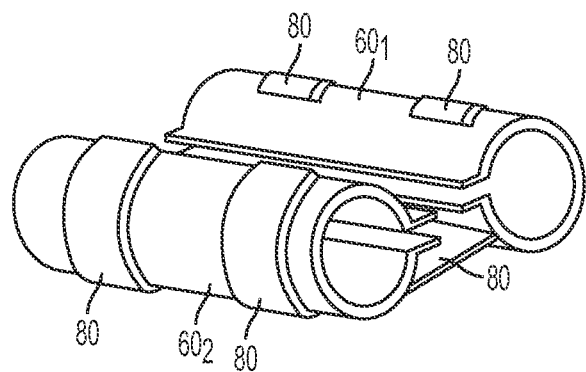
FIGS. 9a-c are perspective views of female connector structures according to further embodiments of the present invention.
Figure 9B:
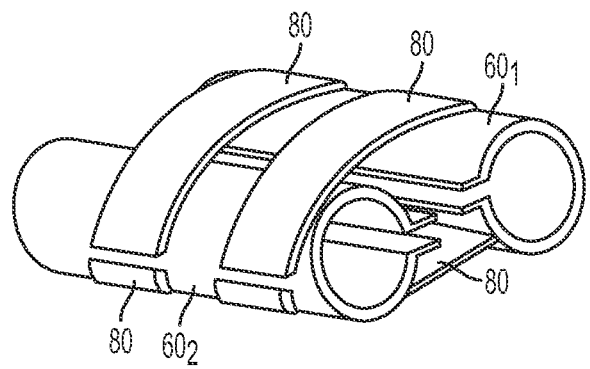
Figure 9C:
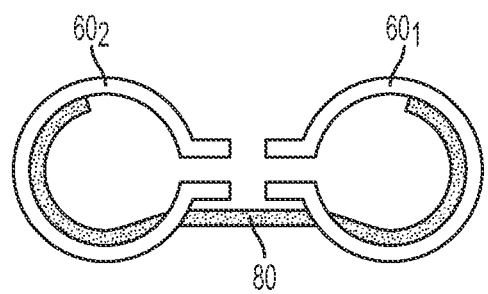

Connections between two or more female connectors 60 in which the cable ends (or connectors) of respective superconducting cables 70 are located could be made through a metal or other non-superconducting electrically conductive material, or through a superconducting connection. Embodiments of a connection of two female connectors $60_1$ and $60_2$ are shown in FIGS. 9a-9c, where one or more (a plurality of) superconducting tapes 80 are soldered or otherwise connected in electrical communication with the outer surface of each phase (or conductive portions 61-64) of the female connectors $60_1$ and $60_2$. A separate respective superconducting tape 80 is provided for (and electrically connected with) each respective phase (or conductive portion 61-64). In particular embodiments, the superconducting tapes 80 are high-temperature superconducting tapes similar to those in the superconducting cable 70. The superconducting tapes 80 are connected such that their superconducting film layer faces and contacts the outer surface of each female connectors $60_1$ and $60_2$, minimizing the electrical resistance.

The superconducting tapes 80 extend from one female connector $60_1$ to the other female connector $60_2$ and may extend around a portion of each female connector $60_1$ and $60_2$ as show in FIGS. 9a and 9b. In FIG. 9a, the superconducting tapes 80 extend from one female connector $60_1$ to the other female connector $60_2$ on one side of the female connectors $60_1$ and $60_2$. In FIG. 9b, the superconducting tapes 80 extend from one female connector $60_1$ to the other female connector $60_2$ on two sides of the female connectors $60_1$ and $60_2$. In further embodiments as shown in FIG. 9c, the superconducting tapes 80 extend from one female connector $60_1$ to the other female connector $60_2$ by passing through openings in each of the female connectors $60_1$ and $60_2$.

In particular embodiments, the superconducting tapes 80 are sufficiently flexible, so as to flex or move with the motion of the female connector $60_1$ or $60_2$ when the female connector $60_1$ or $60_2$ is clamped onto the cable end (or connector) of the superconducting cable 70. In further embodiments, two or more female connectors $60_1$ and $60_2$ are connected to two respective superconducting cables 70 and, together with their superconducting connecting tapes 80, are part of and held by a supporting body (not shown). In other embodiments, one or more non-superconducting electrically conductive wire or other material connects the respective phases (or conductive portions 61-64) of two or more female connectors $60_1$ and $60_2$ together, instead of (or in addition to) the superconducting tapes 80.

Thus, in embodiments that employ one or more female connectors $60_1$ and $60_2$, installation in a cryostat can be accomplished, for example, by pulling one or more superconducting cables (e.g., cable 70) through a cryostat as described above with respect to FIGS. 4a-d. Then, the superconducting cables may be cut to a desired length. The cable ends are stripped to expose the phases, axially spaced along a portion of the length of each cable end as shown in FIGS. 1-3. Then, a conductive sleeve may be provided over each exposed phase. Each cable end is inserted into a respective female connector $60_1$ or $60_2$, and the female connectors are clamped onto the cable ends and, in particular embodiments, are soldered in place.

When connected, the female connector $60_1$ or $60_2$ are in electrical communication with the phases of the superconducting cables (e.g., cable 70) received therein to provide a current flow path. In embodiments in which the superconducting tapes in the superconducting cables 70 are wound with their superconducting film facing outward, current exits the tape directly into the female connector structure $60_1$ or $60_2$. In embodiments in which the tapes are wound with their superconducting film on the inside, current exits the superconducting film and flows through a non-superconducting electrically conductive interface structure, such as copper, or solder (or a combination thereof) from the inside outward, flowing around the resistive buffer layers of the tapes. In particular embodiments, this non-superconducting electrically conductive interface structure is formed by a metal or other electrically conductive material that is plated around the superconducting tapes, or through a metal or other conductive material that is wound underneath the tapes in each phase, or through a metal or other conductive material that is wound in parallel with the superconducting tapes in each layer, or through solder that has flowed between the tapes of the cable, or any combination thereof.

Thus a current flow path is formed to allow current to flow from the superconducting cable 70, through the interface with the female connector structure $60_1$ or $60_2$, and into the superconducting tapes 80 that are pre-installed on the female connector structure $60_1$ or $60_2$ as shown in FIG. 9. In the embodiment of FIG. 9c, the superconducting tapes 80 is located on the inner surface of the female connector structure $60_1$ or $60_2$, to provide a current flow path for current to flow directly from the cable into the superconducting connector tapes 80, thus lowering the resistance of the connection.

The current flow path allows current to flow through the superconducting connector tape 80 from one female connector structure $60_1$ or $60_2$ to another female connector structure $60_1$ or $60_2$, through that other female connector structure, or into the superconducting cable 70 in that female connector structure $60_1$ or $60_2$. Two current leads that introduce and remove current to and from the superconducting cable 70 are connected to the two appropriate phases of the two appropriate female connector structures $60_1$ and $60_2$.

Figure 10A:
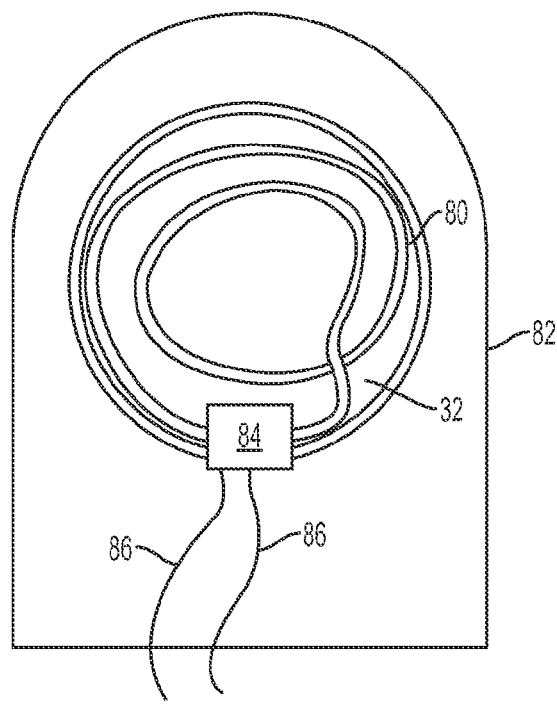
FIGS. 10a and 10b are schematic views of a CORC degaussing cable installed in a hull of a ship according to embodiments of the present invention.
Figure 10B:
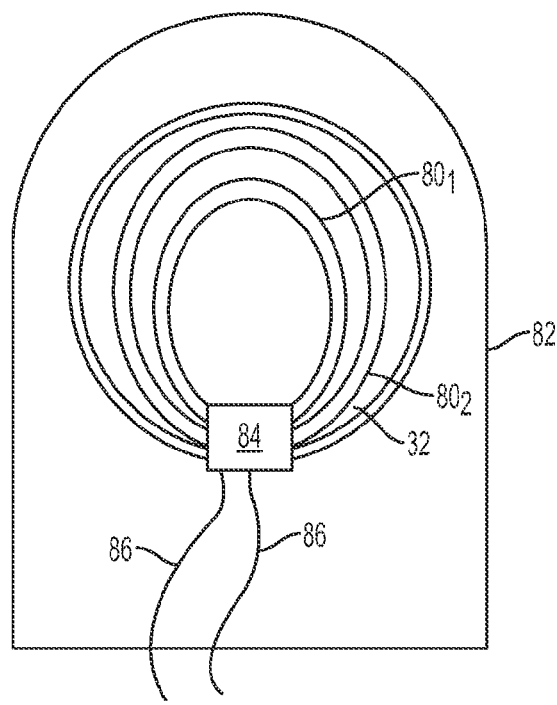

An example of a CORC degaussing cable system as described herein, installed on a ship is illustrated in FIGS. 10a-b. In particular, an example in which a single multiphase superconducting cable 80 (such as any of the superconducting cables 10, 10', 10'', 40, or 70 or other suitable superconducting cable) is looped multiple times around a cryostat chamber or other suitable structure within the hull 82 of a ship and connected in a junction box 84 is shown in FIG. 10a.

In the junction box 84, the two end portions of the multiphase superconducting cable 80 may be electrically connected (with phases staggered) as described above with respect to FIG. 5.

A pair of electrically conductive leads 86 extends into the junction box 84 and electrically connect to appropriate phases of the superconducting cable 80. In particular embodiments, one of the conductive leads 86 connects to the first or innermost phase of one end portion of the superconducting cable 40, while the other conductive lead 86 connects to the last or outermost phase of the other end portion of the superconducting cable 40, as described above with respect to FIG. 5.

A further example where multiple multiphase CORC degaussing cables $80_1$ and $80_2$, are looped around a cryostat chamber or other suitable structure within the hull 82 of the ship and connect in a junction box 84 is shown in FIG. 10b. Each CORC degaussing cable $80_1$ and $80_2$, may be configured according to any of the superconducting cables 10, 10', 10'', 40, 50, 52 or 70 or other suitable superconducting cable). In the junction box 84, the end portions of the multiphase superconducting cables $80_1$ and $80_2$ may be electrically connected (with phases staggered) as described above with respect to FIG. 6 or FIG. 7. A pair of electrically conductive leads 86 extends into the junction box 84 and electrically connect to appropriate phases of the superconducting cables $80_1$ and $80_2$. In particular embodiments, one of the conductive leads 86 connects to the first or inner-most phase of one end portion of the superconducting cable $80_1$, while the other conductive lead 86 connects to the last or outermost phase of an end portion of the superconducting cable $80_2$, as described above with respect to FIGS. 6 and 7.

The conductive leads 86 are connected to control electronics (not shown) for controlling the flow of current through the superconducting cables. In either of the embodiments of FIGS. 10a and 10b, end portions of the superconducting cables may be electrically connected in the junction box 84 with connector structures, such as, but not limited to the connectors and connector structures described and shown with respect to FIGS. 8 and 9a-c.

In a further example, a CORC degaussing system includes multiple CORC degaussing cables as described herein, that each loop around multiple times on the inside of the hull of the ship (not shown).

Embodiments disclosed herein are to be considered in all respects as illustrative and not restrictive of the invention. The scope of the invention is indicated by the appended claims, rather than the foregoing description. All changes that come within the meaning and range of equivalency of the claims are therefore intended to be embraced therein.

What is claimed is:

1. A superconducting cable and connection structure comprising:
   a first superconducting cable end section having a plurality of superconducting tapes wound about a former in a plurality of phases, including a first phase and a second phase, the first phase is located closer to the former than is the second phase, the first phase extends further toward a distal end of the first superconducting cable end section than does the second phase;
   a second superconducting cable end section having a plurality of superconducting tapes wound about a former in a plurality of phases, including a first phase and a further phase, the first phase of the second superconducting cable end section is located closer to the former than is the further phase of the second superconducting cable end section, the first phase of the second superconducting cable end section extends further toward a distal end of the second superconducting cable end section than does the further phase of the second superconducting cable end section;
   wherein the first and second superconducting cable end sections are arranged with the first phase of the second superconducting cable end section electrically coupled to the second phase of the first superconducting cable end section, and with the further phase of the second superconducting cable end section being free of electrical contact at the second superconducting cable end section with each phase of the first superconducting cable end section at the first superconducting cable end section.

2. A superconducting cable and connection structure as recited in claim 1, further comprising:
   a third superconducting cable end section having at least one superconducting tape wound about a former in a plurality of phases, including a first phase and a second phase, the first phase of the third superconducting cable end section is located closer to the former than is the second phase of the third superconducting cable end section, the first phase of the third superconducting cable end section extends further toward a distal end of the third superconducting cable end section than does the second phase of the third superconducting cable end section;
   wherein the second and third superconducting cable end sections are arranged with the further phase of the second superconducting cable end section electrically coupled to the first phase of the third superconducting cable end section.

3. A superconducting cable and connection structure as recited in claim 2, further comprising:
   a fourth superconducting cable end section having a plurality of superconducting tapes wound about a former in a plurality of phases, including a first phase and a second phase, the first phase of the fourth superconducting cable end section is located closer to the former than is the second phase of the fourth superconducting cable end section, the first phase of the fourth superconducting cable end section extends further toward a distal end of the fourth superconducting cable end section than does the second phase of the fourth superconducting cable end section;
   wherein the third and fourth superconducting cable end sections are arranged with the second phase of the third superconducting cable end section electrically coupled to the first phase of the fourth superconducting cable end section.

4. A superconducting cable and connection structure as recited in claim 1, wherein:
   the first phase of the first superconducting cable end section forms a first terminal that is free of electrical contact at the first superconducting cable end section with each phase of the second superconducting cable end section at the second superconducting cable end section, the further phase of the second superconducting cable end section forms a second terminal that is free of electrical contact at the second superconducting cable end section with each phase of the first superconducting cable end section at the first superconducting end section, and one of the first and second terminals is configured to receive current and the other of the first and second terminals is configured to emit current.

5. A superconducting cable and connection structure as recited in claim 1, wherein:
   the plurality of superconducting tapes includes a plurality of first superconducting tapes wound in the first phase and a plurality of second superconducting tapes wound in the second phase.

6. A superconducting cable and connection structure as recited in claim 1, wherein:
   the plurality of phases in the first superconducting cable end section further includes a third phase;
   the plurality of phases in the second superconducting cable end section further includes a second phase, the second phase in the second superconducting cable end section being closer to the former than is the further phase in the second superconducting cable end section; and
   the second phase of the second superconducting cable end section is electrically coupled to the third phase of the first superconducting cable end section.

7. A superconducting cable and connection structure as recited in claim 6, wherein:
   the second phase in the first superconducting cable end section is closer to the former than is the third phase in the first superconducting cable end section and the second phase in the first superconducting cable end section extends further toward the distal end of the first superconducting cable end section than does the third phase in the first superconducting cable end section; and
   the second phase in the second superconducting cable end section extends further toward the distal end of the second superconducting cable end section than does the further phase in the second superconducting cable end section.

8. A superconducting cable and connection structure comprising:
   a first superconducting cable end section having a plurality of superconducting tapes wound about a former in a plurality of phases, including a first phase and a second phase, the first phase is located closer to the former than is the second phase, the first phase extends further toward a distal end of the first superconducting cable end section than does the second phase;

a second superconducting cable end section having a plurality of superconducting tapes wound about a former in a plurality of phases, including a first phase and a second phase, the first phase of the second superconducting cable end section is located closer to the former than is the second phase of the second superconducting cable end section, the first phase of the second superconducting cable end section extends further toward a distal end of the second superconducting cable end section than does the second phase of the second superconducting cable end section;

wherein the first and second superconducting cable end sections are arranged with the first phase of the second superconducting cable end section electrically coupled to the second phase of the first superconducting cable end section;

wherein the first superconducting cable end section and the second superconducting cable end section are two ends of the same superconducting cable.

9. A superconducting cable and connection structure as recited in claim 8, wherein the superconducting cable is formed in a loop or coil.

10. A superconducting cable and connection structure as recited in claim 1, wherein:
the first superconducting cable end section comprises an end of a first superconducting cable; and
the second superconducting cable end section comprises an end of a second superconducting cable.

11. A superconducting cable and connection structure as recited in claim 10, wherein at least one of the first and second superconducting cables is formed in a loop or coil.

12. A superconducting cable and connection structure as recited in claim 10, wherein each of the first and second superconducting cables is formed in a loop or coil.

13. A superconducting cable and connection structure as recited in claim 1, further comprising:
a first connector structure coupled to the first superconducting cable end section, the first connector structure having first and second electrically conductive sections separated from each other by at least one electrically insulating section, the first section of the first connector structure at least partially surrounding and electrically coupled to the first phase of the first superconducting cable end section, the second section of the first connector structure at least partially surrounding and electrically coupled to the second phase of the first superconducting cable end section; and
a second connector structure coupled to the second superconducting cable end section, the second connector structure having first and second electrically conductive sections separated from each other by at least one electrically insulating section, the first section of the second connector structure at least partially surrounding and electrically coupled to the first phase of the second superconducting cable end section, the second section of the second connector structure at least partially surrounding and electrically coupled to a second phase of the second superconducting cable end section;
wherein the first section of the first connector structure is electrically connected to the second section of the second connector structure.

14. A superconducting cable and connection structure as recited in claim 13, wherein the first section of the first connector structure is electrically connected to the second section of the second connector structure through at least one connector superconducting tape coupled to the first section of the first connector structure and the second section of the second connector structure.

15. A superconducting cable and connection structure as recited in claim 14, wherein:
the first connector structure comprises a cylindrical or partially cylindrical body having an open interior in which at least a portion of the first superconducting cable end section extends;
the second connector structure comprises a cylindrical or partially cylindrical body having an open interior in which at least a portion of the second superconducting cable end section extends; and
the at least one connector superconducting tape is electrically connected to an outer surface of the cylindrical or partially cylindrical body of the first connector structure and to an outer surface of the cylindrical or partially cylindrical body of the second connector structure.

16. A superconducting cable and connection structure as recited in claim 14, wherein:
the first connector structure comprises a cylindrical or partially cylindrical body having an open interior in which at least a portion of the first superconducting cable end section extends;
the second connector structure comprises a cylindrical or partially cylindrical body having an open interior in which at least a portion of the second superconducting cable end section extends; and
the at least one electrically conductive connector conductor electrically connected to an inner surface of the cylindrical or partially cylindrical body of the first connector structure and to an inner surface of the cylindrical or partially cylindrical body of the second connector structure.

17. A superconducting cable and connection structure as recited in claim 16, wherein the at least one electrically conductive connector conductor comprises at least one connector superconducting tape.

18. A superconducting cable and connection structure as recited in claim 13, wherein the first section of the first connector structure includes a first terminal for electrically connection to a current lead, and the second section of the second connector structure includes a second terminal for electrically connection to a current lead.

19. A superconducting cable and connection structure as recited in claim 1, further comprising an electrically insulating material arranged between the first phase and the second phase of superconducting tapes in the first superconducting cable end section.

20. A superconducting cable and connection structure as recited in claim 19, wherein the first phase of the first superconducting cable end section extends further toward a distal end of the first superconducting cable end section than does the insulating material, and wherein the insulating material extends further toward a distal end of the first superconducting cable end section than does the second phase of the first superconducting cable end section.

21. A superconducting cable and connection structure as recited in claim 20, further comprising an electrically insulating material arranged between the first phase and a second phase of superconducting tapes in the second superconducting cable end wherein the first phase of the second superconducting cable end section extends further toward a distal end of the second superconducting cable end section than does the insulating material, and wherein the insulating material extends further toward a distal end of the second superconducting cable end section than does the second phase of the second superconducting cable end section.

22. A method of making a superconducting cable and connection structure comprising:
    providing a first superconducting cable end section having at least one superconducting tape wound about a former in a plurality of phases, including a first phase and a second phase, the first phase is located closer to the former than is the second phase, the first phase extends further toward a distal end of the first superconducting cable end section than does the second phase;
    providing a second superconducting cable end section having at least one superconducting tape wound about a former in a plurality of phases, including a first phase and a second phase, the first phase of the second superconducting cable end section is located closer to the former than is the second phase of the second superconducting cable end section, the first phase of the second superconducting cable end section extends further toward a distal end of the second superconducting cable end section than does the second phase of the second superconducting cable end section; and
    electrically coupling the first phase of the second superconducting cable end section to the second phase of the first superconducting cable end section, and wherein the second phase of the second superconducting cable end section is free of electrical contact at the second superconducting cable end section with each phase of the first superconducting cable end section at the first superconducting cable end section.

23. A method as recited in claim 22, further comprising:
    providing a third superconducting cable end section having at least one superconducting tape wound about a former in a plurality of phases, including a first phase and a second phase, the first phase of the third superconducting cable end section is located closer to the former than is the second phase of the third superconducting cable end section, the first phase of the third superconducting cable end section extends further toward a distal end of the third superconducting cable end section than does the second phase of the third superconducting cable end section; and
    electrically coupling the further phase of the second superconducting cable end section to the first phase of the third superconducting cable end section.

24. A method as recited in claim 23, further comprising:
    providing a fourth superconducting cable end section having at least one superconducting tape wound about a former in a plurality of phases, including a first phase and a second phase, the first phase of the fourth superconducting cable end section is located closer to the former than is the second phase of the fourth superconducting cable end section, the first phase of the fourth superconducting cable end section extends further toward a distal end of the fourth superconducting cable end section than does the second phase of the fourth superconducting cable end section; and
    electrically coupling the second phase of the third superconducting cable end section electrically to the first phase of the fourth superconducting cable end section.

25. A method as recited in claim 22, wherein:
    the first phase of the first superconducting cable end section forms a first terminal that is free of electrical contact at the first superconducting cable end section with each phase of the second superconducting cable end section at the second superconducting cable end section, the further phase of the second superconducting cable end section forms a further terminal that is free of electrical contact at the second superconducting cable end section with each phase of the first superconducting cable end section at the first superconducting end section, and
    the method further comprising connecting one of the first and second terminals to receive current and the other of the first and second terminals to emit current.

26. A method as recited in claim 22, wherein:
    the at least one superconducting tape of the first superconducting cable end section comprises a plurality of superconducting tapes, including at least one first superconducting tape wound in the first phase and at least one second superconducting tape wound in the second phase.

27. A method as recited in claim 22, wherein:
    the plurality of phases in the first superconducting cable end section further includes a third phase;
    the plurality of phases in the second superconducting cable end section further includes a second phase, the second phase in the second superconducting cable end section being closer to the former than is the further phase in the second superconducting cable end section; and
    the method further comprising electrically coupling the second phase of the second superconducting cable end section to the third phase of the first superconducting cable end section.

28. A method as recited in claim 27, wherein:
    the second phase in the first superconducting cable end section is closer to the former than is the third phase in the first superconducting cable end section and the second phase in the first superconducting cable end section extends further toward the distal end of the first superconducting cable end section than does the third phase in the first superconducting cable end section; and
    the second phase in the second superconducting cable end section extends further toward the distal end of the second superconducting cable end section than does the further phase in the second superconducting cable end section.

29. A method of making a superconducting cable and connection structure comprising:
    providing a first superconducting cable end section having at least one superconducting tape wound about a former in a plurality of phases, including a first phase and a second phase, the first phase is located closer to the former than is the second phase, the first phase extends further toward a distal end of the first superconducting cable end section than does the second phase;
    providing a second superconducting cable end section having at least one superconducting tape wound about a former in a plurality of phases, including a first phase and a second phase, the first phase of the second superconducting cable end section is located closer to the former than is the second phase of the second superconducting cable end section, the first phase of the second superconducting cable end section extends further toward a distal end of the second superconducting cable end section than does the second phase of the second superconducting cable end section; and
    electrically coupling the first phase of the second superconducting cable end section to the second phase of the first superconducting cable end section;
    wherein the first superconducting cable end section and the second superconducting cable end section are two ends of the same superconducting cable.

30. A method as recited in claim 29, further comprising forming the superconducting cable in a loop or coil.

31. A method as recited in claim 22, wherein:
the first superconducting cable end section comprises an end of a first superconducting cable;
the second superconducting cable end section comprises an end of a second superconducting cable.

32. A method as recited in claim 31, further comprising forming at least one of the first and second superconducting cables in a loop or coil.

33. A method as recited in claim 31, further comprising forming each of the first and second superconducting cables in a loop or coil.

34. A method as recited in claim 22, further comprising:
coupling a first connector structure to the first superconducting cable end section, the first connector structure having first and second electrically conductive sections separated from each other by at least one electrically insulating section, including arranging the first section of the first connector structure to at least partially surround and electrically couple with the first phase of the first superconducting cable end section, and arranging the second section of the first connector structure to at least partially surround and electrically couple to the second phase of the first superconducting cable end section;
coupling a second connector structure to the second superconducting cable end section, the second connector structure having first and second electrically conductive sections separated from each other by at least one electrically insulating section, including arranging the first section of the second connector structure to at least partially surround and electrically couple to the first phase of the second superconducting cable end section, and arranging the second section of the second connector structure to at least partially surround and electrically couple to a second phase of the second superconducting cable end section; and
electrically connecting the first section of the first connector structure to the second section of the second connector structure.

35. A method as recited in claim 34, further comprising electrically connecting the first section of the first connector structure to the second section of the second connector structure through at least one electrically conductive connector conductor coupled to the first section of the first connector structure and the second section of the second connector structure.

36. A method as recited in claim 35, wherein the first connector structure comprises a cylindrical or partially cylindrical body having an open interior in which at least a portion of the first superconducting cable end section extends;
the second connector structure comprises a cylindrical or partially cylindrical body having an open interior in which at least a portion of the second superconducting cable end section extends;
the method further comprising electrically connecting at least one connector superconducting tape to an outer surface of the cylindrical or partially cylindrical body of the first connector structure and to an outer surface of the cylindrical or partially cylindrical body of the second connector structure.

37. A method as recited in claim 35, wherein the first connector structure comprises a cylindrical or partially cylindrical body having an open interior in which at least a portion of the first superconducting cable end section extends;
the second connector structure comprises a cylindrical or partially cylindrical body having an open interior in which at least a portion of the second superconducting cable end section extends;
the method further comprising electrically connecting at least one connector superconducting tape to an inner surface of the cylindrical or partially cylindrical body of the first connector structure and to an inner surface of the cylindrical or partially cylindrical body of the second connector structure.

38. A method as recited in claim 35, wherein the at least one electrically conductive connector conductor comprises at least one superconducting tape.

* * * * *